US007649988B2

(12) United States Patent
Suppappola et al.

(10) Patent No.: US 7,649,988 B2
(45) Date of Patent: Jan. 19, 2010

(54) COMFORT NOISE GENERATOR USING MODIFIED DOBLINGER NOISE ESTIMATE

(75) Inventors: Seth Suppappola, Tempe, AZ (US); Samuel Ponvarma Ebenezer, Tempe, AZ (US); Justin L. Allen, Mesa, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 1359 days.

(21) Appl. No.: 10/868,989

(22) Filed: Jun. 15, 2004

(65) Prior Publication Data

US 2005/0278171 A1 Dec. 15, 2005

(51) Int. Cl.
*H04M 9/08* (2006.01)

(52) U.S. Cl. ........................................ 379/406.03

(58) Field of Classification Search ............. 379/406.03
See application file for complete search history.

(56) References Cited

U.S. PATENT DOCUMENTS

| | | | | |
|---|---|---|---|---|
| 6,289,309 | B1 * | 9/2001 | deVries | 704/233 |
| 6,453,289 | B1 * | 9/2002 | Ertem et al. | 704/225 |
| 6,604,071 | B1 * | 8/2003 | Cox et al. | 704/225 |
| 6,760,435 | B1 * | 7/2004 | Etter et al. | 379/406.01 |
| 7,027,804 | B2 * | 4/2006 | Mufti et al. | 455/417 |

* cited by examiner

*Primary Examiner*—Alexander Jamal
(74) *Attorney, Agent, or Firm*—Paul F. Wille

(57) ABSTRACT

A background noise estimate based upon a modified Doblinger noise estimate is used for modulating the output of a pseudo-random phase spectrum generator to produce the comfort noise. The circuit for estimating noise includes a smoothing filter having a slower time constant for updating the noise estimate during noise than during speech. Comfort noise is smoothly inserted by basing the amount of comfort noise on the amount of noise suppression. A discrete inverse Fourier transform converts the comfort noise back to the time domain and overlapping windows eliminate artifacts that may have been produced during processing.

10 Claims, 8 Drawing Sheets

FIG. 1
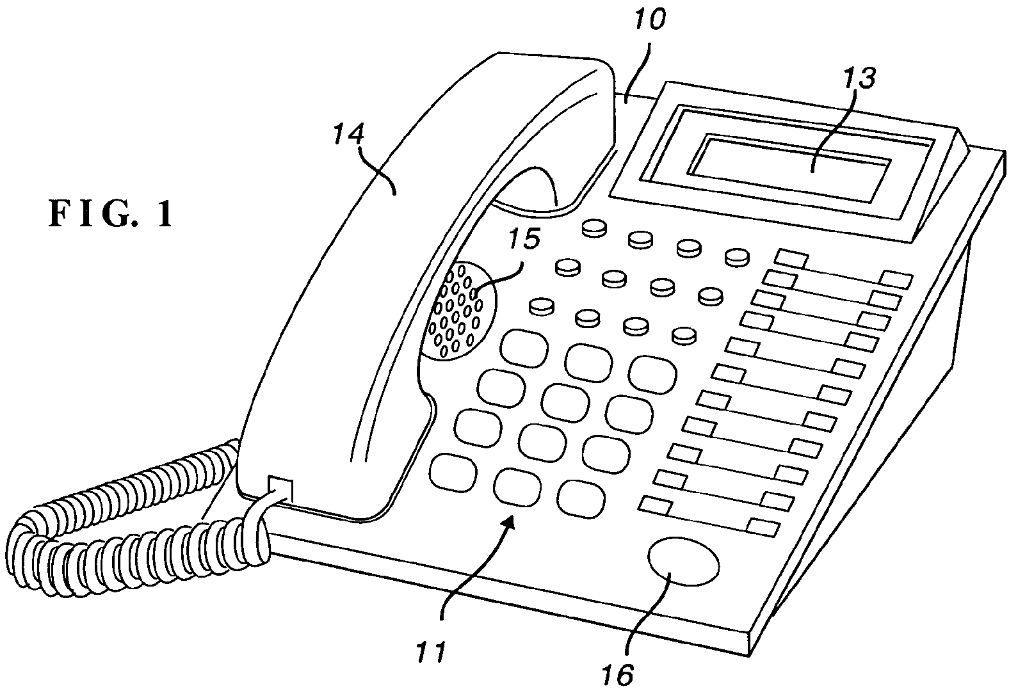
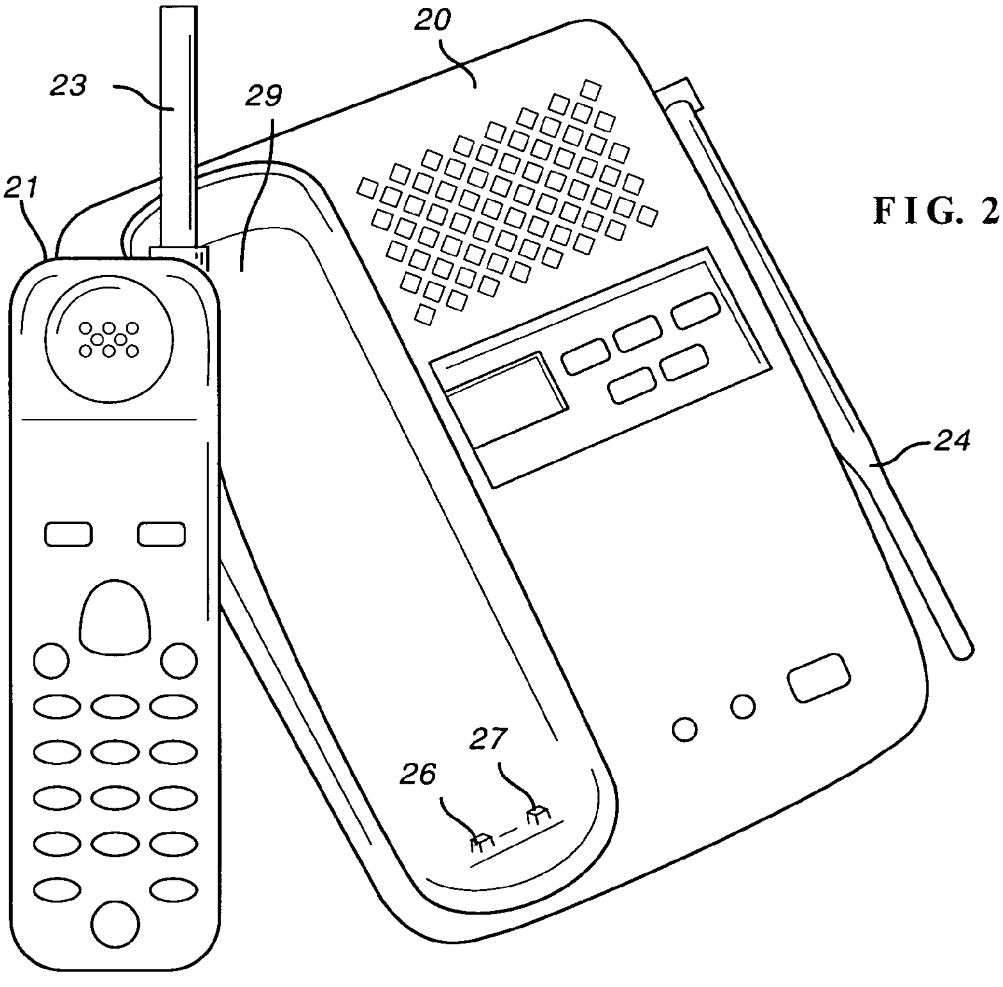
FIG. 2

COMFORT NOISE GENERATOR USING MODIFIED DOBLINGER NOISE ESTIMATE

CROSS-REFERENCE TO RELATED APPLICATION

This application relates to application Ser. No. 10/830,652, filed Apr. 22, 2004, entitled Noise Suppression Based on Bark Band Weiner Filtering and Modified Doblinger Noise Estimate, assigned to the assignee of this invention, and incorporated by reference herein in its entirety.

BACKGROUND OF THE INVENTION

This invention relates to audio signal processing and, in particular, to a circuit that uses an improved estimate of background noise for generating comfort noise.

As used herein, "telephone" is a generic term for a communication device that utilizes, directly or indirectly, a dial tone from a licensed service provider. As such, "telephone" includes desk telephones (see FIG. 1), cordless telephones (see FIG. 2), speaker phones (see FIG. 3), hands free kits (see FIG. 4), and cellular telephones (see FIG. 5), among others. For the sake of simplicity, the invention is described in the context of telephones but has broader utility; e.g. communication devices that do not utilize a dial tone, such as radio frequency transceivers or intercoms.

There are many sources of noise in a telephone system. Some noise is acoustic in origin while the source of other noise is electronic, the telephone network, for example. As used herein, "noise" refers to any unwanted sound, whether or not the unwanted sound is periodic, purely random, or somewhere in-between. As such, noise includes background music, voices of people other than the desired speaker, tire noise, wind noise, and so on. Automobiles can be especially noisy environments.

As broadly defined, noise could include an echo of the speaker's voice. However, echo cancellation is separately treated in a telephone system and involves modeling the transfer characteristic of a signal path. Moreover, the model is changed or adapted over time as the characteristics, e.g. frequency response and delay or phase shift, of the path change.

A state of the art adaptive echo canceling algorithm alone is not sufficient to cancel an echo completely. A modeling error introduced by the echo canceler will result in a residual echo after the echo cancellation process. This residual echo is annoying to a listener. Residual echo is a problem whether or not there is background noise. Even if the background noise level is greater than the residual echo, the residual echo is annoying because, as the residual echo comes and goes, it is more perceptible to the listener. In most cases, the spectral properties of the residual echo are different from the background noise, making it even more perceptible.

Various techniques, such as residual echo suppresser and non-linear processor, are employed to eliminate the residual echo. Even though a residual echo suppresser works well in a noise free environment, some additional signal processing is needed to make this technique work in a noisy environment. In a noisy environment, the non-linear processing of the residual echo suppresser produces what is known as noise pumping. When the residual echo is suppressed, the additive background noise is also suppressed, resulting in noise pumping. To reduce the annoying effects of noise pumping, comfort noise, matched to the background noise, is inserted when the echo suppresser is activated.

Those of skill in the art recognize that, once an analog signal is converted to digital form, all subsequent operations can take place in one or more suitably programmed microprocessors. Use of the word "signal", for example, does not necessarily mean either an analog signal or a digital signal. Data in memory, even a single bit, can be a signal.

"Efficiency" in a programming sense is the number of instructions required to perform a function. Few instructions are better or more efficient than many instructions. In languages other than machine (assembly) language, a line of code may involve hundreds of instructions. As used herein, "efficiency" relates to machine language instructions, not lines of code, because the number of instructions that can be executed per unit time determines how long it takes to perform an operation or to perform some function.

In the prior art, estimating noise power is computationally intensive, requiring either rapid calculation or sufficient time to complete a calculation. Rapid calculation requires high clock rates and more electrical power than desired, particularly in battery operated devices. Taking too much time for a calculation can lead to errors because the input signal has changed significantly during calculation.

In view of the foregoing, it is therefore an object of the invention to provide a more efficient system for generating high resolution comfort noise based upon an improved background noise estimator.

Another object of the invention is to provide an efficient system for generating comfort noise that is spectrally matched to background noise.

A further object of the invention is to provide a comfort noise generator that substantially eliminates noise pumping.

SUMMARY OF THE INVENTION

The foregoing objects are achieved in this invention in which a background noise estimate based upon a modified Doblinger noise estimate is used for modulating the output of a pseudo-random phase spectrum generator to produce the comfort noise. The circuit for estimating noise includes a smoothing filter having a slower time constant for updating the noise estimate during noise than during speech. The comfort noise generator further includes a circuit to adjust the gain of the comfort noise based upon the amount of noise suppressed. A discrete inverse Fourier transform converts the comfort noise back to the time domain and overlapping windows eliminate artifacts that may have been produced during processing.

BRIEF DESCRIPTION OF THE DRAWINGS

A more complete understanding of the invention can be obtained by considering the following detailed description in conjunction with the accompanying drawings, in which:

FIG. 1 is a perspective view of a desk telephone;

FIG. 2 is a perspective view of a cordless telephone;

Figure 3:
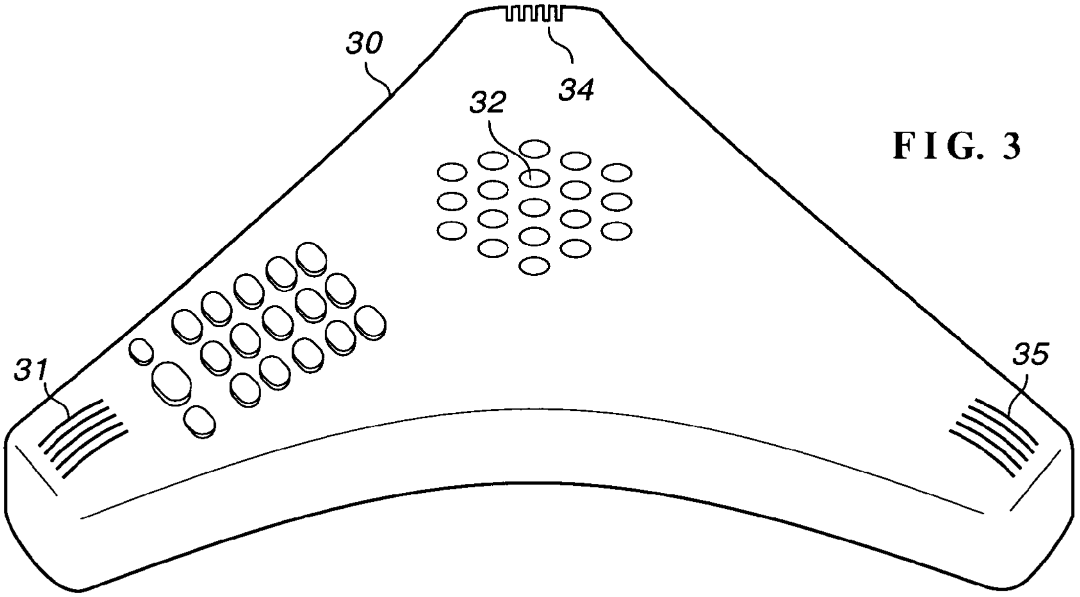
FIG. 3 is a perspective view of a conference phone or a speaker phone.

Because a signal can be analog or digital, a block diagram can be interpreted as hardware, software, e.g. a flow chart, or a mixture of hardware and software. Programming a microprocessor is well within the ability of those of ordinary skill in the art, either individually or in groups.

DETAILED DESCRIPTION OF THE INVENTION

This invention finds use in many applications where the internal electronics is essentially the same but the external appearance of the device is different. FIG. 1 illustrates a desk telephone including base 10, keypad 11, display 13 and handset 14. As illustrated in FIG. 1, the telephone has speaker phone capability including speaker 15 and microphone 16. The cordless telephone illustrated in FIG. 2 is similar except that base 20 and handset 21 are coupled by radio frequency signals, instead of a cord, through antennas 23 and 24. Power for handset 21 is supplied by internal batteries (not shown) charged through terminals 26 and 27 in base 20 when the handset rests in cradle 29.

FIG. 3 illustrates a conference phone or speaker phone such as found in business offices. Telephone 30 includes microphone 31 and speaker 32 in a sculptured case. Telephone 30 may include several microphones, such as microphones 34 and 35 to improve voice reception or to provide several inputs for echo rejection or noise rejection, as disclosed in U.S. Pat. No. 5,138,651 (Sudo).

Figure 4:
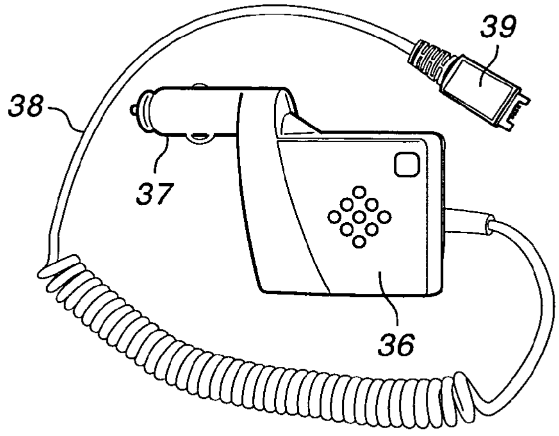
FIG. 4 is a perspective view of a hands free kit.
Figure 5:
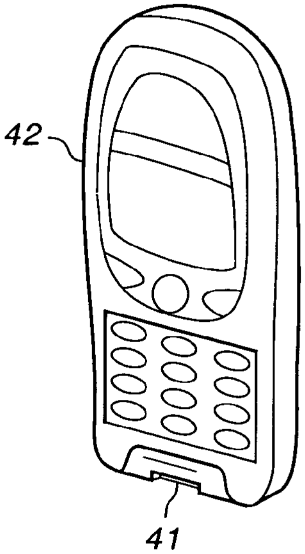
FIG. 5 is a perspective view of a cellular telephone.

FIG. 4 illustrates what is known as a hands free kit for providing audio coupling to a cellular telephone, illustrated in FIG. 5. Hands free kits come in a variety of implementations but generally include powered speaker 36 attached to plug 37, which fits an accessory outlet or a cigarette lighter socket in a vehicle. A hands free kit also includes cable 38 terminating in plug 39. Plug 39 fits the headset socket on a cellular telephone, such as socket 41 (FIG. 5) in cellular telephone 42. Some kits use RF signals, like a cordless phone, to couple to a telephone. A hands free kit also typically includes a volume control and some control switches, e.g. for going "off hook" to answer a call. A hands free kit also typically includes a visor microphone (not shown) that plugs into the kit. Audio processing circuitry constructed in accordance with the invention can be included in a hands free kit or in a cellular telephone.

Figure 6:
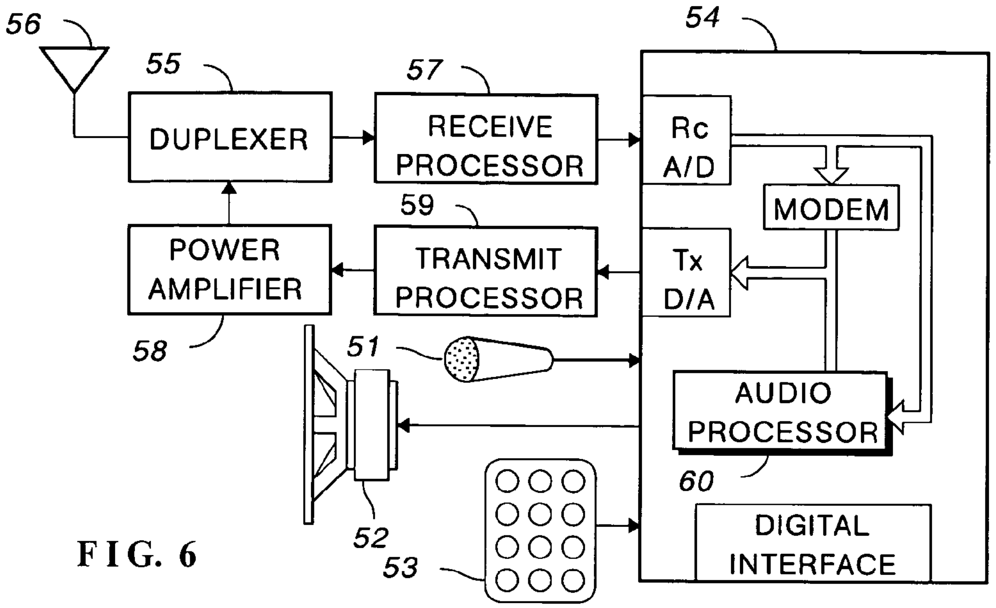
FIG. 6 is a generic block diagram of audio processing circuitry in a telephone.

The various forms of telephone can all benefit from the invention. FIG. 6 is a block diagram of the major components of a cellular telephone. Typically, the blocks correspond to integrated circuits implementing the indicated function. Microphone 51, speaker 52, and keypad 53 are coupled to signal processing circuit 54. Circuit 54 performs a plurality of functions and is known by several names in the art, differing by manufacturer. For example, Infineon calls circuit 54 a "single chip baseband IC." QualComm calls circuit 54 a "mobile station modem." The circuits from different manufacturers obviously differ in detail but, in general, the indicated functions are included.

A cellular telephone includes both audio frequency and radio frequency circuits. Duplexer 55 couples antenna 56 to receive processor 57. Duplexer 55 couples antenna 56 to power amplifier 58 and isolates receive processor 57 from the power amplifier during transmission. Transmit processor 59 modulates a radio frequency signal with an audio signal from circuit 54. In non-cellular applications, such as speakerphones, there are no radio frequency circuits and signal processor 54 may be simplified somewhat. Problems of echo cancellation and noise remain and are handled in audio processor 60. It is audio processor 60 that is modified to include the invention.

Most modern noise reduction algorithms are based on a technique known as spectral subtraction. If a clean speech signal is corrupted by an additive and uncorrelated noisy signal, then the noisy speech signal is simply the sum of the signals. If the power spectral density (PSD) of the noise source is completely known, it can be subtracted from the noisy speech signal using a Wiener filter to produce clean speech; e.g. see J. S. Lim and A. V. Oppenheim, "Enhancement and bandwidth compression of noisy speech," *Proc. IEEE,* vol. 67, pp. 1586-1604, December 1979. Normally, the noise source is not known, so the critical element in a spectral subtraction algorithm is the estimation of power spectral density (PSD) of the noisy signal.

Noise reduction using spectral subtraction can be written as $$P_s(f)=P_x(f)-P_n(f),$$

wherein $P_s(f)$ is the power spectrum of speech, $P_x(f)$ is the power spectrum of noisy speech, and $P_n(f)$ is the power spectrum of noise. The frequency response of the subtraction process can be written as follows.

$$H(f)=\sqrt{\frac{P_x(f)-\beta\hat{P}_n(f)}{P_x(f)}}$$

$\hat{P}_n(f)$ is the power spectrum of the noise estimate and β is a spectral weighting factor based upon subband signal to noise ratio. The clean speech estimate is obtained by $$Y(f)=X(f)H(f).$$

In a single channel noise suppression system, the PSD of a noisy signal is estimated from the noisy speech signal itself, which is the only available signal. In most cases, the noise estimate is not accurate. Therefore, some adjustment needs to be made in the process to reduce distortion resulting from inaccurate noise estimates. For this reason, most methods of noise suppression introduce a parameter, β, that controls the spectral weighting factor, such that frequencies with low signal to noise ratio (S/N) are attenuated and frequencies with high S/N are not modified.

Figure 7:
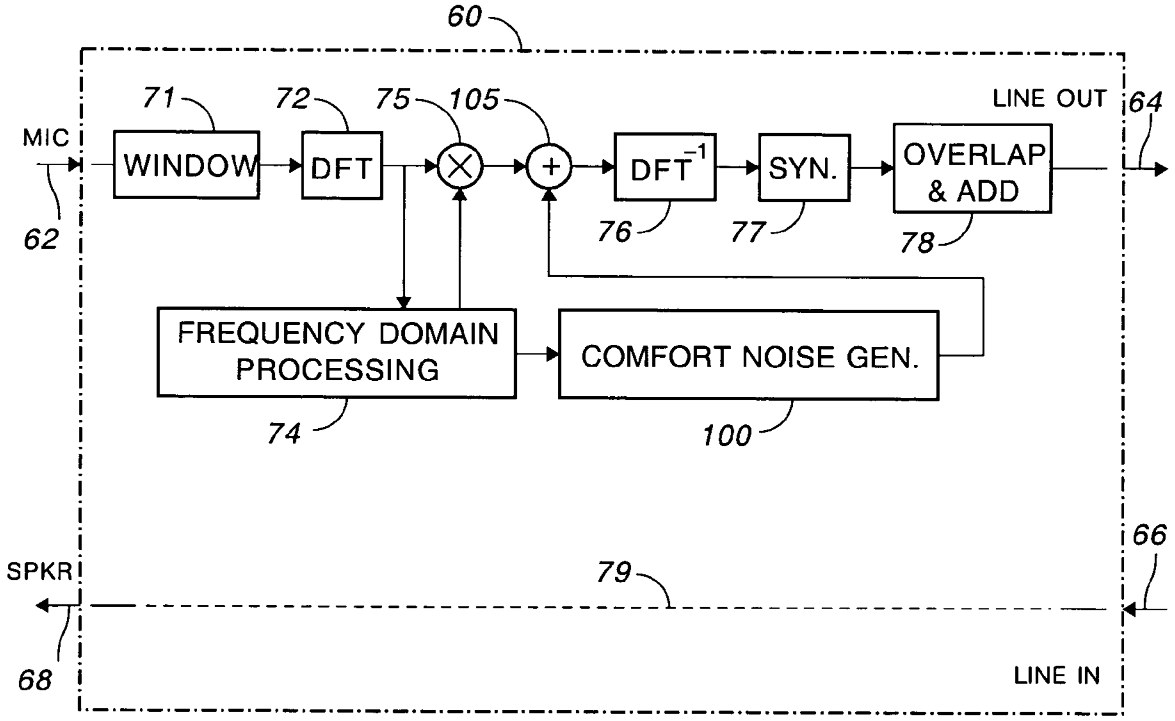
FIG. 7 is a block diagram of a noise suppresser constructed in accordance with the invention.

FIG. 7 is a block diagram of a portion of audio processor 60 including a noise suppresser and a comfort noise generator constructed in accordance with the invention. In addition to noise suppression and comfort noise generation, audio processor 60 includes echo cancellation, additional filtering, and other functions, that are not part of this invention. In the following description, the numbers in the headings relate to the blocks in FIG. 7. A second noise suppression circuit and comfort noise generator can be coupled in the receive channel, between line input 66 and speaker output 68, represented by dashed line 79.

71—Analysis Window

The noise reduction process is performed by processing blocks of information. The size of the block is one hundred twenty-eight samples, for example. In one embodiment of the invention, the input frame size is thirty-two samples. Hence, the input data must be buffered for processing. A buffer of size one hundred twenty-eight words is used before windowing the input data.

The buffered data is windowed to reduce the artifacts introduced by block processing in the frequency domain. Different window options are available. The window selection is based on different factors, namely the main lobe width, side lobes levels, and the overlap size. The type of window used in the pre-processing influences the main lobe width and the side lobe levels. For example, the Hanning window has a broader main lobe and lower side lobe levels as compared to a rectangular window. Several types of windows are known in the art and can be used, with suitable adjustment in some parameters such as gain and smoothing coefficients.

The artifacts introduced by frequency domain processing are exacerbated further if less overlap is used. However, if more overlap is used, it will result in an increase in computational requirements. Using a synthesis window reduces the artifacts introduced at the reconstruction stage. Considering all the above factors, a smoothed, trapezoidal analysis window and a smoothed, trapezoidal synthesis window, each with twenty-five percent overlap, are used. For a 128-point discrete Fourier transform, a twenty-five percent overlap means that the last thirty-two samples from the previous frame are used as the first (oldest) thirty-two samples for the current frame.

D, the size of the overlap, equals ($2 \cdot D_{ana}$-$D_{syn}$). If $D_{ana}$ equals 24 and $D_{syn}$ equals 16, then D=32. The analysis window, $W_{ana}(n)$, is given by the following.

$$\left(\frac{n+1}{D_{ana}+1}\right) \text{ for } 0 \le n < D_{ana},$$

$$1 \text{ for } D_{ana} \le n < 128 - D_{ana}, \text{ and}$$

$$\left(\frac{128-n}{D_{ana}+1}\right) \text{ for } 128 - D_{ana} \le n < 128$$

The synthesis window, $W_{syn}(n)$, is given by the following.

$$0 \text{ for } 0 \le n < (D_{and} - D_{syn})$$

$$\left(\frac{D_{ana}+1}{D-n}\right)*\left(\frac{D_{ana}-n}{D_{syn}+1}\right) \text{ for } (D_{ana} - D_{syn}) \le n < D_{ana}$$

$$1 \text{ for } D_{ana} \le n < 128 - D_{ana}$$

$$\left(\frac{D_{ana}+1}{n-(128-D-1)}\right)*\left(\frac{n-(128-D_{ana}-1)}{D_{syn}+1}\right) \text{ for } 128 - D_{ana} \le n < 128 - (D_{ana} - D_{syn}), \text{ and}$$

$$0 \text{ for } 128 - (D_{ana} - D_{syn}) \le n < 128$$

The central interval is the same for both windows. For perfect reconstruction, the analysis window and the synthesis window satisfy the following condition.

$$W_{ana}(n)W_{syn}(n)+W_{ana}(n+128-D)W_{syn}(n+128-D)=1$$

in the interval $0 \leqq n < D$ and $$W_{ana}(n)W_{syn}(n)=1$$

in the interval $D \leqq n < 96$.

The buffered data is windowed using the analysis window $$x_w(m,n)=x(m,n)*W_{ana}(n)$$

where x(m,n) is the buffered data at frame m.

72—Forward Discrete Fourier Transform (DFT)

The windowed time domain data is transformed to the frequency domain using the discrete Fourier transform given by the following transform equation.

$$X(m,k) = \frac{2}{N}\sum_{n=0}^{N-1} x_\omega(m,n)\exp\left(\frac{-j2\pi nk}{N}\right), k = 0, 1, 2, \ldots, (N-1)$$

where $x_w(m,n)$ is the windowed time domain data at frame m and X(m,k) is the transformed data at frame m and N is the size of DFT. Because the input time domain data is real, the output of DFT is normalized by a factor N/2.

74—Frequency Domain Processing

Figure 8:
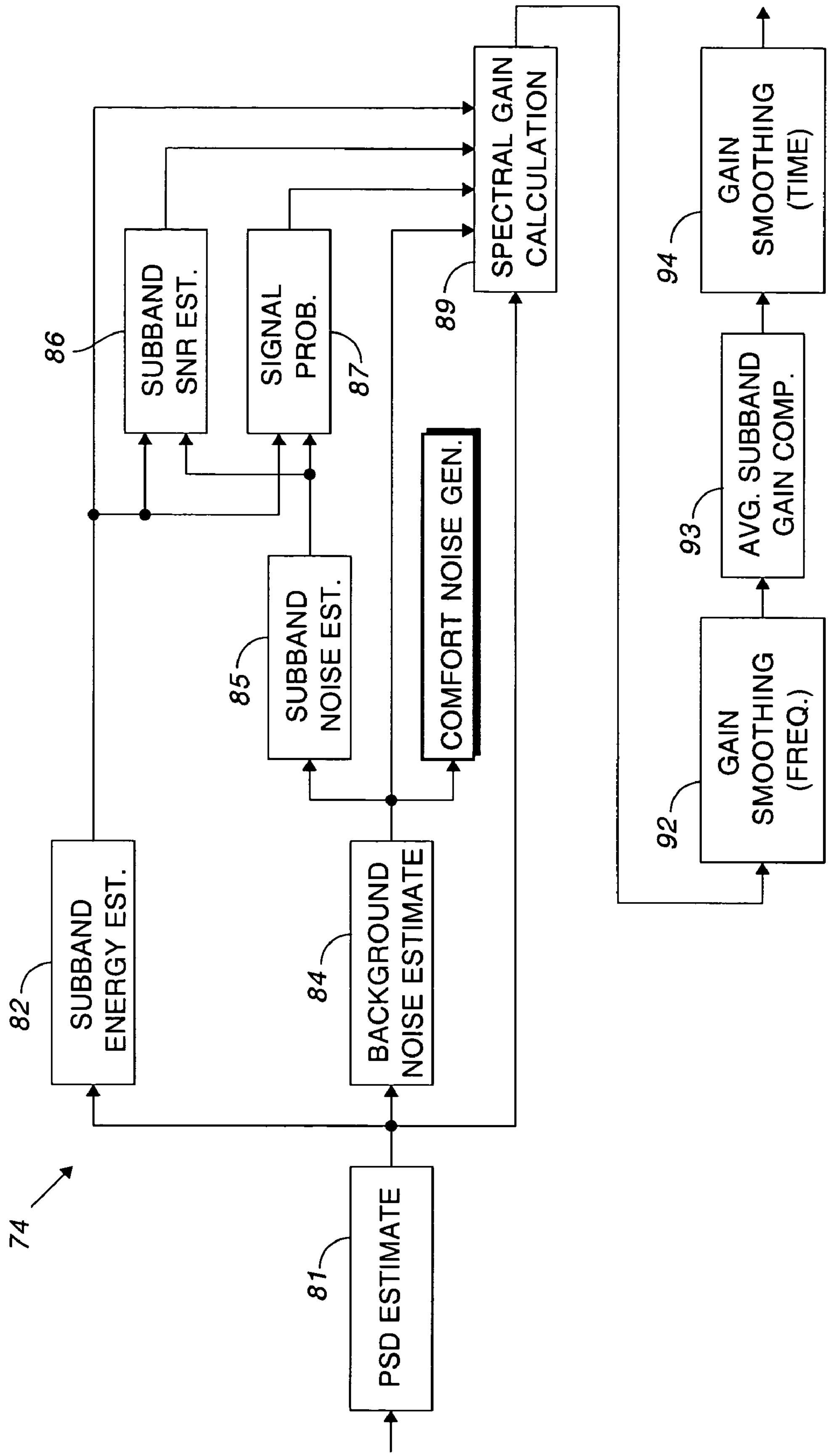
FIG. 8 is a block diagram of a circuit for calculating noise.

The frequency response of the noise suppression circuit is calculated and has several aspects that are illustrated in the block diagram of FIG. 8. In the following description, the heading numbers refer to blocks in FIG. 8. Comfort noise generator 100 taps into the frequency domain processing circuit to share the data generated from the background noise estimate.

81—Power Spectral Density (PSD) Estimation

The power spectral density of the noisy speech is approximated using a first-order recursive filter defined as follows.

$$P_x(m,k)=\epsilon_s P_x(m-1,k)+(1-\epsilon_s)|X(m,k)|^2$$

where $P_x(m,k)$ is the power spectral density of the noisy speech at frame m and $P_x(m-1,k)$ is the power spectral density of the noisy speech at frame m-1. $|X(m,k)|^2$ is the magnitude spectrum of the noisy speech at frame m and k is the frequency index. $\epsilon_s$ is a spectral smoothing factor.

82—Bark Band Energy Estimation

Subband based signal analysis is performed to reduce spectral artifacts that are introduced during the noise reduction process. The subbands are based on Bark bands (also called "critical bands") that model the perception of a human ear. The band edges and the center frequencies of Bark bands in the narrow band speech spectrum are shown in the following Table.

| Band No. | Range (Hz) | Center Freq. (Hz) |
|---|---|---|
| 1 | 0-100 | 50 |
| 2 | 100-200 | 150 |
| 3 | 200-300 | 250 |
| 4 | 300-400 | 350 |
| 5 | 400-510 | 455 |
| 6 | 510-630 | 570 |
| 7 | 630-770 | 700 |
| 8 | 770-920 | 845 |
| 9 | 920-1080 | 1000 |
| 10 | 1080-1270 | 1175 |
| 11 | 1270-1480 | 1375 |
| 12 | 1480-1720 | 1600 |
| 13 | 1720-2000 | 1860 |
| 14 | 2000-2320 | 2160 |
| 15 | 2320-2700 | 2510 |
| 16 | 2700-3150 | 2925 |
| 17 | 3150-3700 | 3425 |
| 18 | 3700-4400 | 4050 |

The DFT of the noisy speech frame is divided into 17 Bark bands. For a 128-point DFT, the spectral bin numbers corresponding to each Bark band is shown in the following table.

| Band No. | Freq. Range (Hz) | Spectral Bin Number | No. of points |
|---|---|---|---|
| 1 | 0-125 | 0, 1, 2 | 3 |
| 2 | 187.5-250 | 3, 4 | 2 |
| 3 | 312.5-375 | 5, 6 | 2 |
| 4 | 437.5-500 | 7, 8 | 2 |
| 5 | 562.5-625 | 9, 10 | 2 |
| 6 | 687.5-750 | 11, 12 | 2 |
| 7 | 812.5-875 | 13, 14 | 2 |
| 8 | 937.5-1062.5 | 15, 16, 17 | 3 |
| 9 | 1125-1250 | 18, 19, 20 | 3 |
| 10 | 1312.5-1437.5 | 21, 22, 23 | 3 |
| 11 | 1500-1687.5 | 24, 25, 26, 27 | 4 |
| 12 | 1750-2000 | 28, 29, 30, 31, 32 | 5 |
| 13 | 2062.5-2312.5 | 33, 34, 35, 36, 37 | 5 |
| 14 | 2375-2687.5 | 38, 39, 40, 41, 42, 43 | 6 |
| 15 | 2750-3125 | 44, 45, 46, 47, 48, 49, 50 | 7 |
| 16 | 3187.5-3687.5 | 51, 52, 53, 54, 55, 56, 57, 58, 59 | 9 |
| 17 | 3750-4000 | 60, 61, 62, 63, 64 | 5 |

The energy of noisy speech in each Bark band is calculated as follows.

$$E_x(m, i) = \sum_{k=f_L(i)}^{f_H(i)} P_x(m, k)$$

The energy of the noise in each Bark band is calculated as follows.

$$E_n(m, i) = \sum_{k=f_L(i)}^{f_H(i)} P_n(m, k)$$

where $f_H(i)$ and $f_L(i)$ are the spectral bin numbers corresponding to highest and lowest frequency respectively in Bark band i and $P_x(m,k)$ and $P_n(m,k)$ are the power spectral density of the noisy speech and noise estimate respectively.

84—Noise Estimation

Rainer Martin was an early proponent of noise estimation based on minimum statistics; see "Spectral Subtraction Based on Minimum Statistics," *Proc. 7th European Signal Processing Conf.,* EUSIPCO-94, Sep. 13-16, 1994, pp. 1182-1185. This method does not require a voice activity detector to find pauses in speech to estimate background noise. This algorithm instead uses a minimum estimate of power spectral density within a finite time window to estimate the noise level. The algorithm is based on the observation that an estimate of the short term power of a noisy speech signal in each spectral bin exhibits distinct peaks and valleys over time. To obtain reliable noise power estimates, the data window, or buffer length, must be long enough to span the longest conceivable speech activity, yet short enough for the noise to remain approximately stationary. The noise power estimate $P_n(m,k)$ is obtained as a minimum of the short time power estimate $P_x(m,k)$ within a window of M subband power samples. To reduce the computational complexity of the algorithm and to reduce the delay, the data to one window of length M is decomposed into w windows of length l such that l*w=M.

Figure 9:
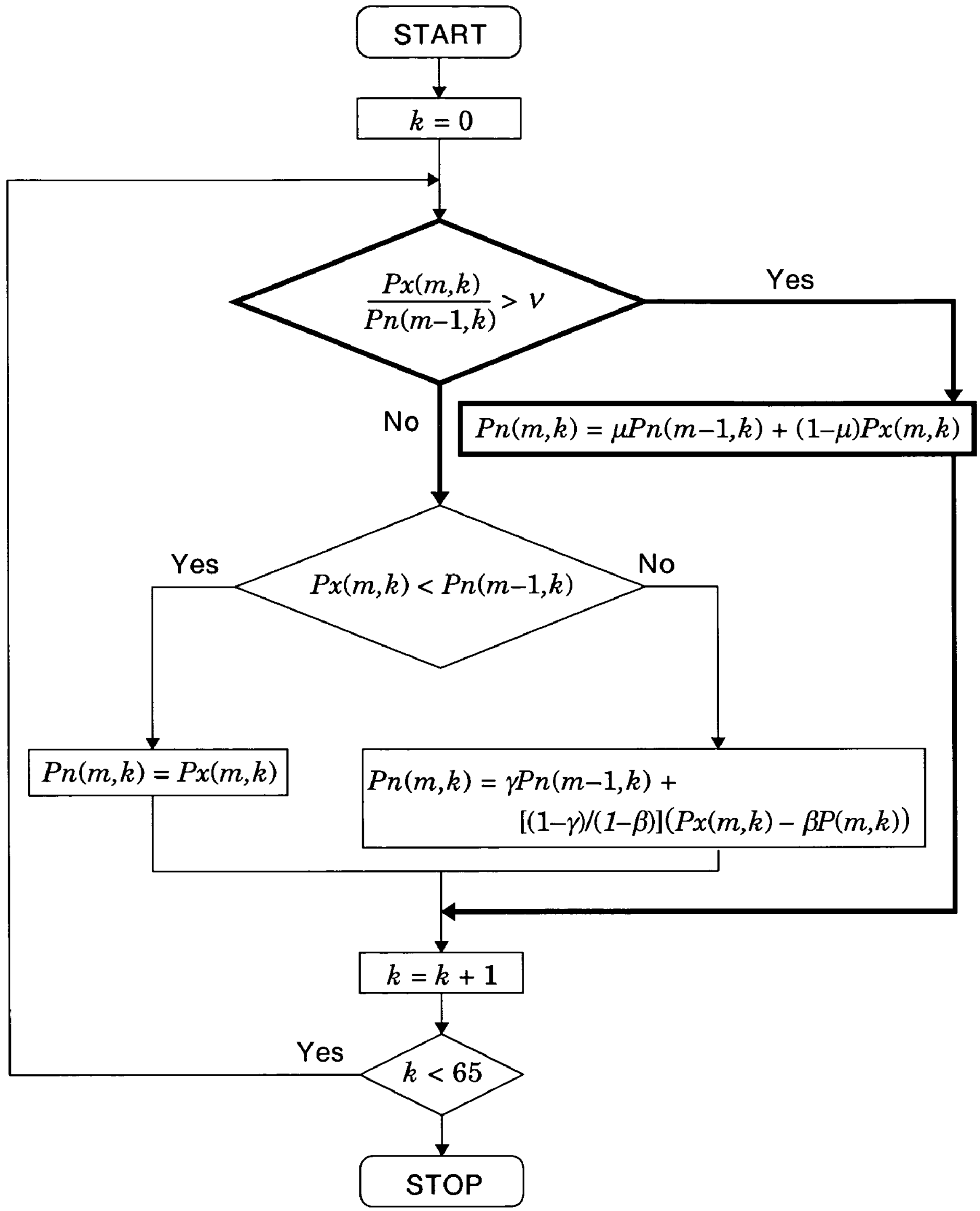
FIG. 9 is a flow chart illustrating a process for calculating a modified Doblinger noise estimate.

Even though using a sub-window based search for minimum reduces the computational complexity of Martin's noise estimation method, the search requires large amounts of memory to store the minimum in each sub-window for every subband. Gerhard Doblinger has proposed a computationally efficient algorithm that tracks minimum statistics; see G. Doblinger, "Computationally efficient speech enhancement by spectral minima tracking in subbands," *Proc. 4th European Conf. Speech, Communication and Technology,* EUROSPEECH'95, Sep. 18-21, 1995, pp. 1513-1516. The flow diagram of this algorithm is shown in thinner line in FIG. 9. According to this algorithm, when the present (frame m) value of the noisy speech spectrum is less than the noise estimate of the previous frame (frame m-1), then the noise estimate is updated to the present noisy speech spectrum. Otherwise, the noise estimate for the present frame is updated by a first-order smoothing filter. This first-order smoothing is a function of present noisy speech spectrum $P_x(m,k)$, noisy speech spectrum of the previous frame $P_x(m-1,k)$, and the noise estimate of the previous frame $P_n(m-1,k)$. The parameters $\beta$ and $\gamma$ in FIG. 9 are used to adjust to short-time stationary disturbances in the background noise. The values of $\beta$ and $\gamma$ used in the algorithm are 0.5 and 0.995, respectively, and can be varied.

Doblinger's noise estimation method tracks minimum statistics using a simple first-order filter requiring less memory. Hence, Doblinger's method is more efficient than Martin's minimum statistics algorithm. However, Doblinger's method overestimates noise during speech frames when compared with the Martin's method, even though both methods have the same convergence time. This overestimation of noise will distort speech during spectral subtraction.

In accordance with the invention, Doblinger's noise estimation method is modified by the additional test inserted in the process, indicated by the thicker lines in FIG. 9. According to the modification, if the present noisy speech spectrum deviates from the noise estimate by a large amount, then a first-order exponential averaging smoothing filter with a very slow time constant is used to update the noise estimate of the present frame. The effect of this slow time constant filter is to reduce the noise estimate and to slow down the change in estimate.

The parameter $\mu$ in FIG. 9 controls the convergence time of the noise estimate when there is a sudden change in background noise. The higher the value of parameter $\mu$, the slower the convergence time and the smaller is the speech distortion. Hence, tuning the parameter $\mu$ is a tradeoff between noise estimate convergence time and speech distortion. The parameter v controls the deviation threshold of the noisy speech spectrum from the noise estimate. In one embodiment of the invention, v had a value of 3. Other values could be used instead. A lower threshold increases convergence time. A higher threshold increases distortion. A range of 1-9 is believed usable but the limits are not critical.

Figure 10:
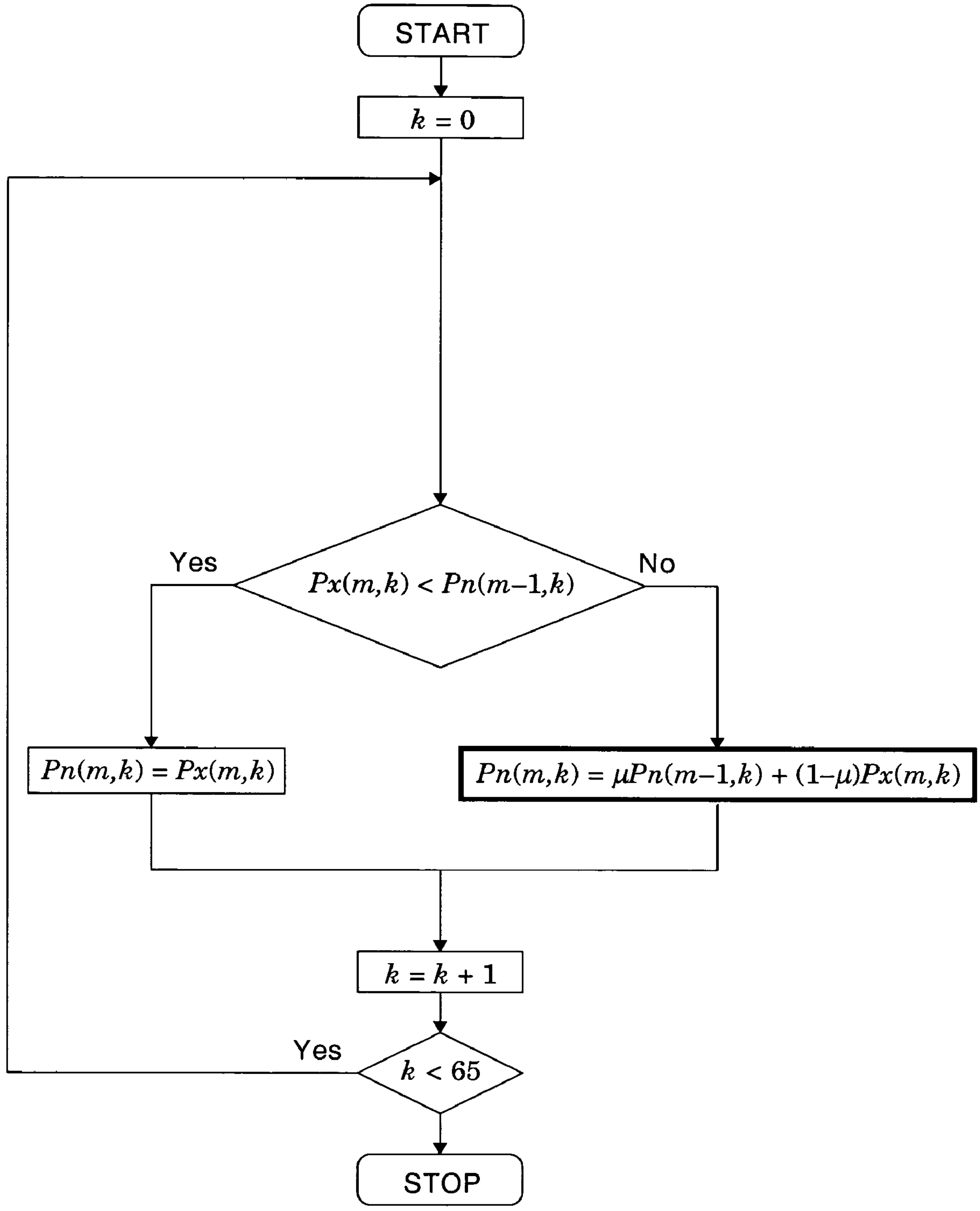
FIG. 10 is a flow chart illustrating an alternative process for calculating a modified Doblinger noise estimate.

FIG. 10 is a flow chart of a simplified, modified Doblinger method. The Doblinger method compares the present frame of noisy speech spectrum with the noisy speech spectrum of the previous frame and picks a filter accordingly. In the flow chart of FIG. 10, the filter with the long time constant is used when SNR is increasing. The process of FIG. 10 eliminates the parameters $\beta$, $\gamma$, and v from the process of FIG. 9 but uses the new parameter, $\mu$. The simplified method illustrated in FIG. 10 requires less memory and is slightly faster than the method illustrated in FIG. 9.

89—Spectral Gain Calculation

Modified Weiner Filtering

Various sophisticated spectral gain computation methods are available in the literature. See, for example, Y. Ephraim and D. Malah, "Speech enhancement using a minimum mean-square error short-time spectral amplitude estimator," *IEEE Trans. Acoust. Speech, Signal Processing,* vol. ASSP-32, pp. 1109-1121, December 1984; Y. Ephraim and D. Malah, "Speech enhancement using a minimum mean-square error log-spectral amplitude estimator," *IEEE Trans. Acoust. Speech, Signal Processing,* vol. ASSP-33 (2), pp. 443-445, April 1985; and I. Cohen, "On speech enhancement under signal presence uncertainty," *Proceedings of the 26th IEEE International Conference on Acoustics, Speech, and Signal Processing,* ICASSP-01, Salt Lake City, Utah, pp. 7-11, May 2001.

A closed form of spectral gain formula minimizes the mean square error between the actual spectral amplitude of speech and an estimate of the spectral amplitude of speech. Another closed form spectral gain formula minimizes the mean square error between the logarithm of actual amplitude of speech and the logarithm of estimated amplitude of speech. Even though these algorithms may be optimum in a theoretical sense, the actual performance of these algorithms is not commercially viable in very noisy conditions. These algorithms produce musical tone artifacts that are significant even in moderately noisy environments. Many modified algorithms have been derived from the two outlined above.

It is known in the art to calculate spectral gain as a function of signal to noise ratio based on generalized Weiner filtering; see L. Arslan, A. McCree, V. Viswanathan, "New methods for adaptive noise suppression," *Proceedings of the 26th IEEE International Conference on Acoustics, Speech, and Signal Processing,* ICASSP-01, Salt Lake City, Utah, pp. 812-815, May 2001. The generalized Weiner filter is given by $$H(m,k)=\sqrt{\frac{\hat{P}s(m,k)}{\hat{P}s(m,k)+\alpha\hat{P}n(m,k)}}$$

where $\hat{P}s(m,k)$ is the clean speech power spectrum estimate, $\hat{P}n(m,k)$ is the power spectrum of the noise estimate and $\alpha$ is the noise suppression factor. There are many ways to estimate the clean speech spectrum. For example, the clean speech spectrum can be estimated as a linear predictive coding model spectrum. The clean speech spectrum can also be calculated from the noisy speech spectrum Px(m,k) with only a gain modification.

$$\hat{P}s(m,k)=\left(\frac{Ex(m)-En(m)}{En(m)}\right)Px(m,k)$$

where Ex(m) is the noisy speech energy in frame m and En(m) is the noise energy in frame m. Signal to noise ratio, SNR, is calculated as follows.

$$SNR(m)=\left(\frac{Ex(m)-En(m)}{En(m)}\right)$$

Substituting the above equations in the generalized Weiner filter formula, one gets $$H(m,k)=\sqrt{\frac{Px(m,k)}{Px(m,k)+\frac{\alpha'\hat{P}n(m,k)}{SNR(m)}}}$$

where SNR(m) is the signal to noise ratio in frame number m and α' is the new noise suppression factor equal to $(E_x(m)/E_n(m))\alpha$. The above formula ensures stronger suppression for noisy frames and weaker suppression during voiced speech frames because H(m,k) varies with signal to noise ratio.

Bark Band Based Modified Weiner Filtering

The modified Weiner filter solution is based on the signal to noise ratio of the entire frame, m. Because the spectral gain function is based on the signal to noise ratio of the entire frame, the spectral gain value will be larger during a frame of voiced speech and smaller during a frame of unvoiced speech. This will produce "noise pumping", which sounds like noise being switched on and off. To overcome this problem, in accordance with another aspect of the invention, Bark band based spectral analysis is performed. Signal to noise ratio is calculated in each band in each frame, as follows.

$$SNR(m,i)=\left(\frac{Ex(m,i)-En(m,i)}{En(m,i)}\right),$$

where Ex(m,i) and En(m,i) are the noisy speech energy and noise energy, respectively, in band i at frame m. Finally, the Bark band based spectral gain value is calculated by using the Bark band SNR in the modified Weiner solution.

$$H(m,f(i,k))=\sqrt{\frac{Px(m,f(i,k))}{Px(m,f(i,k))+\frac{\alpha'(i)\hat{P}n(m,f(i,k))}{SNR(m,i)}}},$$

$$f_L(i)\le f(i,k)\le f_H(i)$$

where $f_L(i)$ and $f_H(i)$ are the spectral bin numbers of the highest and lowest frequency respectively in Bark band i.

One of the drawbacks of spectral subtraction based methods is the introduction of musical tone artifacts. Due to inaccuracies in the noise estimation, some spectral peaks will be left as a residue after spectral subtraction. These spectral peaks manifest themselves as musical tones. In order to reduce these artifacts, the noise suppression factor α' must be kept at a higher value than calculated above. However, a high value of α' will result in more voiced speech distortion. Tuning the parameter α' is a tradeoff between speech amplitude reduction and musical tone artifacts. This leads to a new mechanism to control the amount of noise reduction during speech The idea of utilizing the uncertainty of signal presence in the noisy spectral components for improving speech enhancement is known in the art; see R. J. McAulay and M. L. Malpass, "Speech enhancement using a soft-decision noise suppression filter," *IEEE Trans. Acoust., Speech, Signal Processing,* vol ASSP-28, pp. 137-145, April 1980. After one calculates the probability that speech is present in a noisy environment, the calculated probability is used to adjust the noise suppression factor, α.

Figure 11:
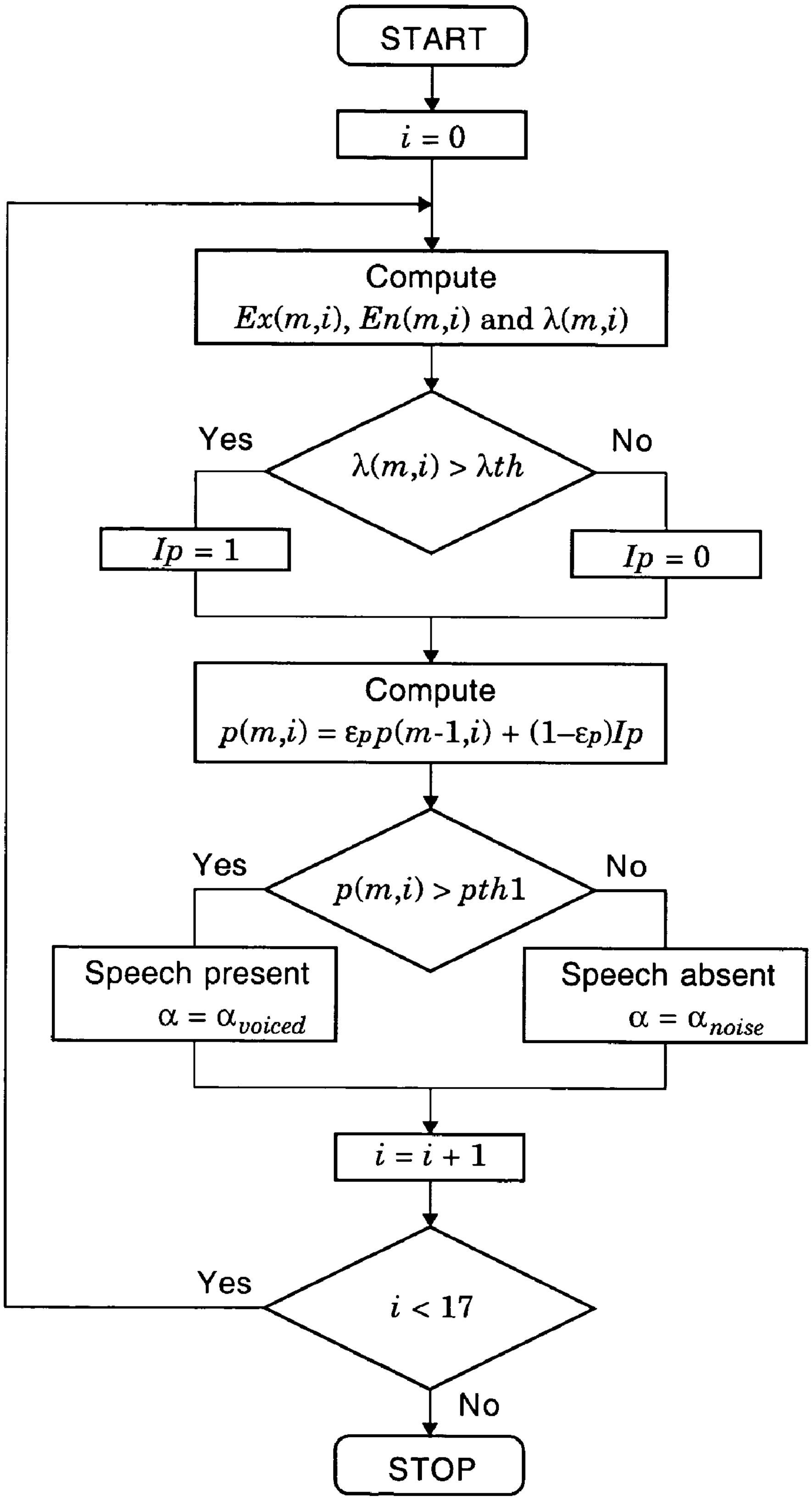
FIG. 11 is a flow chart illustrating a process for estimating the presence or absence of speech in noise and setting a gain coefficient accordingly.

One way to detect voiced speech is to calculate the ratio between the noisy speech energy spectrum and the noise energy spectrum. If this ratio is very large, then we can assume that voiced speech is present. In accordance with another aspect of the invention, the probability of speech being present is computed for every Bark band. This Bark band analysis results in computational savings with good quality of speech enhancement. The first step is to calculate the ratio $$\lambda(m,i)=\frac{E_x(m,i)}{E_n(m,i)},$$

where $E_x$(m,i) and $E_n$(m,i) have the same definitions as before. The ratio is compared with a threshold, $\lambda_{th}$, to decide whether or not speech is present. Speech is present when the threshold is exceeded; see FIG. 11.

The speech presence probability is computed by a first-order, exponential, averaging (smoothing) filter.

$$p(m,i)=\epsilon_p p(m-1,i)+(1-\epsilon_p)I_p$$

where $\epsilon_p$ is the probability smoothing factor and $I_p$ equals one when speech is present and equals zero when speech is absent. The correlation of speech presence in consecutive frames is captured by the filter.

The noise suppression factor, α, is determined by comparing the speech presence probability with a threshold, $p_{th}$. Specifically, α is set to a lower value if the threshold is exceeded than when the threshold is not exceeded. Again, note that the factor is computed for each band.

Spectral Gain Limiting

Spectral gain is limited to prevent gain from going below a minimum value, e.g. −20 dB. The system is capable of less gain but is not permitted to reduce gain below the minimum. The value is not critical. Limiting gain reduces musical tone artifacts and speech distortion that may result from finite precision, fixed point calculation of spectral gain.

The lower limit of gain is adjusted by the spectral gain calculation process. If the energy in a Bark band is less than some threshold, $E_{th}$, then minimum gain is set at −1 dB. If a segment is classified as voiced speech, i.e., the probability exceeds $p_{th}$, then the minimum gain is set to −1 dB. If neither condition is satisfied, then the minimum gain is set to the lowest gain allowed, e.g. −20 dB. In one embodiment of the invention, a suitable value for $E_{th}$ is 0.01. A suitable value for $p_{th}$ is 0.1. The process is repeated for each band to adjust the gain in each band.

Spectral Gain Smoothing

In all block-transform based processing, windowing and overlap-add are known techniques for reducing the artifacts introduced by processing a signal in blocks in the frequency domain. The reduction of such artifacts is affected by several factors, such as the width of the main lobe of the window, the slope of the side lobes in the window, and the amount of overlap from block to block. The width of the main lobe is influenced by the type of window used. For example, a Hanning (raised cosine) window has a broader main lobe and lower side lobe levels than a rectangular window.

Controlled spectral gain smoothes the window and causes a discontinuity at the overlap boundary during the overlap and add process. This discontinuity is caused by the time-varying property of the spectral gain function. To reduce this artifact, in accordance with the invention, the following techniques are employed: spectral gain smoothing along a frequency axis, averaged Bark band gain (instead of using instantaneous gain values), and spectral gain smoothing along a time axis.

92—Gain Smoothing Across Frequency

In order to avoid abrupt gain changes across frequencies, the spectral gains are smoothed along the frequency axis using the exponential averaging smoothing filter given by $$H'(m,k)=\epsilon_{gf}H'(m,k-1)+(1-\epsilon_{gf})H(m,k),$$

where $\epsilon_{gf}$ is the gain smoothing factor across frequency, H(m, k) is the instantaneous spectral gain at spectral bin number k, H'(m,k-1) is the smoothed spectral gain at spectral bin number k-1, and H'(m,k) is the smoothed spectral gain at spectral bin number k.

93—Average Bark Band Gain Computation

Abrupt changes in spectral gain are further reduced by averaging the spectral gains in each Bark band. This implies that all the spectral bins in a Bark band will have the same spectral gain, which is the average among all the spectral gains in that Bark band. The average spectral gain in a band, $H'_{avg}$(m,k), is simply the sum of the gains in a band divided by the number of bins in the band. Because the bandwidth of the higher frequency bands is wider than the bandwidths of the lower frequency bands, averaging the spectral gain is not as effective in reducing narrow band noise in the higher bands as in the lower bands. Therefore, averaging is performed only for the bands having frequency components less than approximately 1.35 kHz. The limit is not critical and can be adjusted empirically to suit taste, convenience, or other considerations.

94—Gain Smoothing Across Time

In a rapidly changing, noisy environment, a low frequency noise flutter will be introduced in the enhanced output speech. This flutter is a by-product of most spectral subtraction based, noise reduction systems. If the background noise is changes rapidly and the noise estimation is able to adapt to the rapid changes, the spectral gain will also vary rapidly, producing the flutter. The low frequency flutter is reduced by smoothing the spectral gain, H"(m,k) across time using a first-order exponential averaging smoothing filter given by $$H''(m,k)=\epsilon_{gt}H''(m-1,k)+(1-\epsilon_{gt})H'_{avg}(m,b(i))\text{ for } f(k)<1.35\text{ kHz, and}$$

$$H''(m,k)=\epsilon_{gt}H''(m-1,k)+(1-\epsilon_{gt})H'(m,k)\text{ for } f(k)\geqq 1.35\text{ kHz},$$

where f(k) is the center frequency of Bark band k, $\epsilon_{gt}$ is the gain smoothing factor across time, b(i) is the Bark band number of spectral bin k, H'(m,k) is the smoothed (across frequency) spectral gain at frame index m, H'(m-1,k) is the smoothed (across frequency) spectral gain at frame index m-1, and $H'_{avg}$(m,k) is the smoothed (across frequency) and averaged spectral gain at frame index m.

Smoothing is sensitive to the parameter $\epsilon_{gt}$ because excessive smoothing will cause a tail-end echo (reverberation) or noise pumping in the speech. There also can be significant reduction in speech amplitude if gain smoothing is set too high. A value of 0.1-0.3 is suitable for $\epsilon_{gt}$. As with other values given, a particular value depends upon how a signal was processed prior to this operation; e.g. gains used.

76—Inverse Discrete Fourier Transform

The clean speech spectrum is obtained by multiplying the noisy speech spectrum with the spectral gain function in block 75. This may not seem like subtraction but recall the initial development given above, which concluded that the clean speech estimate is obtained by $$Y(f)=X(f)H(f).$$

The subtraction is contained in the multiplier H(f).

The clean speech spectrum is transformed back to time domain using the inverse discrete Fourier transform given by the transform equation $$s(m,n)=\sum_{k=0}^{N-1}X(m,k)H(m,k)\exp\left(\frac{j2\pi nk}{N}\right),$$

$$n=0,1,2,3\ldots,N-1$$

where X(m,k)H(m,k) is the clean speech spectral estimate and s(m,n) is the time domain clean speech estimate at frame m.

77—Synthesis Window

The clean speech is windowed using the synthesis window to reduce the blocking artifacts.

$$s_w(m,n)=s(m,n)*W_{syn}(n)$$

78—Overlap and Add

Finally, the windowed clean speech is overlapped and added with the previous frame, as follows.

$$y(m,n)=\begin{cases}s_w(m-1,128-D+n)+s_w(m,n) & 0\le n<D\\ s_w(m,n) & D\le n<128\end{cases}$$

where $s_w$(m-1, . . . ) is the windowed clean speech of the previous frame, $s_w$(m,n) is the windowed clean speech of the present frame and D is the amount of overlap, which, as described above, is 32 in one embodiment of the invention.

Figure 12:
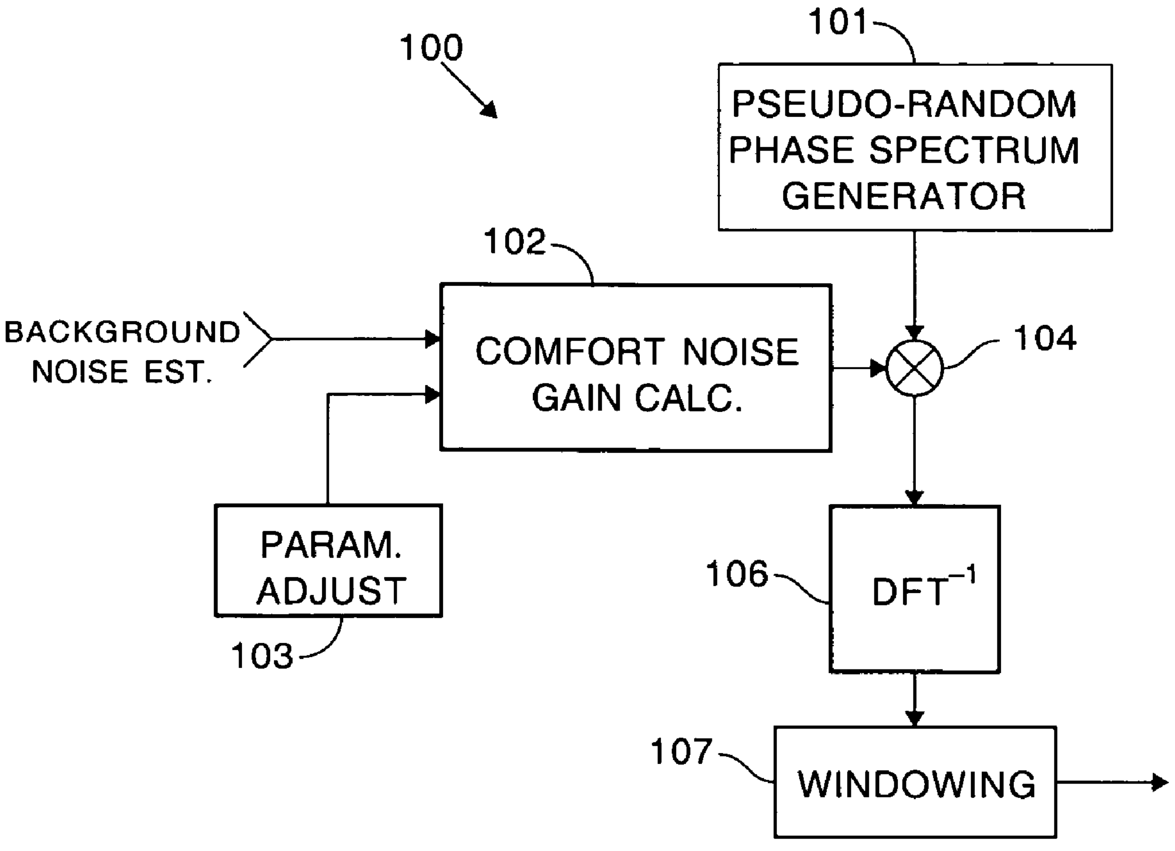
FIG. 12 is a block diagram of a comfort noise generator constructed in accordance with a preferred embodiment of the invention.

FIG. 12 is a block diagram of a comfort noise generator constructed in accordance with a preferred embodiment of the invention. Background noise estimator 84 (FIG. 8) produces high-resolution comfort noise data that matches the background noise spectrum. Comfort noise is generated in the frequency domain by modulating a pseudo-random phase spectrum and is then transformed to the time domain using an inverse DFT. Forward DFT 72 and PSD estimate 81 (FIG. 8) operate as described above for noise suppression.

The modified Doblinger's noise estimation algorithm (FIG. 9 or FIG. 10) is used for estimating background noise. The algorithm parameters are the same for comfort noise generation except for the parameter μ. The parameter μ is used to control the convergence time of the noise estimate when there is a sudden change in background noise. For comfort noise generation, the parameter μ is kept at a higher value than for noise suppression to cause long-term averaging of the noise estimate. This increases the convergence time of the algorithm but reduces overestimation of noise due to speech signal. Overestimating noise can be a serious problem in comfort noise generation because, when there is speech in the presence of little or no background noise, background noise is overestimated and too much comfort noise is generated, producing audible artifacts. Keeping the parameter μ at a higher value results in greater smoothing of noise estimation, thereby mitigating the problem that arises due to overestimation of the background noise.

101—Pseudo-Random Phase Spectrum Generation

A First Technique

This circuit produces a random phase frequency spectrum having unity magnitude. One way to generate the phase spectrum Φ(k) of the comfort noise is by using a pseudo-random number generator, which is uniformly distributed in the range [−π, π]. Using the phase spectrum Φ(k), the unity magnitude and random phase frequency spectrum can be obtained by computing sin(Φ(k)) and cos(Φ(k)) and using the formula, $$C(k)=\cos(\Phi(k))+j\sin(\Phi(k))$$

where k is the spectral bin number, C(k) is the unity magnitude and random phase frequency spectrum. However, this method is computationally intensive, because it involves computation of sin(Φ(k)) and cos(Φ(k)).

Another method is to first generate the random frequency spectrum (both magnitude and phase are random) by using the pseudo-random generator to generate the real and imaginary parts of this spectrum, and then normalize this spectrum to unity magnitude. This can be written as follows, $$C(k)=\frac{X(k)+jY(k)}{\sqrt{X^2(k)+Y^2(k)}}$$

where X(k) and Y(k) are the real and the imaginary parts, respectively, of the random frequency spectrum generated using the pseudo-random number generated that is uniformly distributed within the range [−1,1]. Because the real and the imaginary parts of the random frequency spectrum are uniformly distributed, the derived phase spectrum will not be uniform. In fact, the probability density function (PDF) of this phase spectrum can be written as, $$f_\Phi(\Phi)=\begin{cases}\dfrac{1+\tan^2(\Phi)}{2}, & 0<\Phi\le\pi/4\\ \dfrac{1+\tan^2(\Phi)}{2\tan^2(\Phi)}, & \pi/4<\Phi<\pi/2\\ 0, & \text{otherwise}\end{cases}$$

where $f_\Phi(\Phi)$ is the PDF of the generated phase spectrum. The phase spectrum is not uniform in the range [0, π/2]. By selecting the appropriate boundary values of the uniformly distributed random numbers X and Y, it is possible to generate the phase spectrum with a PDF that is closer to uniform distribution. Compared with the previous method, this method needs one extra random number generator and one fractional division but avoids calculating transcendental functions.

A Second Technique

A simpler and more efficient way to generate a unit magitude, random phase spectrum is by using an eight phase look-up table. The phase spectrum is selected from one of the eight values in the look-up table using a uniformly distributed, random number. Specifically, the number is uniformly distributed in the range [0,1] and is quantized into eight different values. (A random number in the range 0-0.125 is quantized to 1. A random number in the range 0.126-0.250 is quantized to 2, and so on.) The quantized values are also uniformly distributed and correspond to particular phase shifts, e.g. 45°, 90°, and so on. The number of phases is arbitrary. Eight phases have been found sufficient to generate comfort noise without audible artifacts. This technique is more easily implemented than the first technique because it does not involve division or computing trigonometric functions.

102—Comfort Noise Gain Calculation

Comfort noise gain is calculated as a function of background noise level, noise suppression parameters, and a constant that takes into account other unknown system issues. Specifically, comfort noise gain $G_{cng}$(i,k) is calculated as, $$G_{cng}(i,k)=N(k)G_{nr}(i,k)F_v$$

where N(k) is the background noise level in spectral bin number k, $G_{nr}$(i,k) is the Bark band based gain and is a function of noise suppression amount and $F_v$ is the parameter that can be used to compensate for other unknown factors that may affect the end-to-end phone conversation. For example, the vocoder effects on the comfort noise in a cell phone system is unknown when this block is integrated into a cell phone. The adjustment is made during set-up.

103—Noise Reduction Parameter Based Gain Adjustments

If the noise reduction block is also enabled in a system, care should be taken in setting the comfort noise gain in order to smoothly insert the comfort noise. Specifically, the noise reduction dependent Bark band based comfort noise gain $G_{nr}$(i,k) can be written as, $$G_{nr}(i,k)=F_1[\alpha(i)]F_2[\eta_{min}]$$

where i is the Bark band number, $F_1[\alpha(i)]$ is a function of Bark band based noise suppression factor (see "Modified Weiner Filtering" above) and $F_2[\eta_{min}]$ is a function of minimum possible spectral gain (see "Spectral Gain Limiting" above). The function $F_1[(\alpha(i)]$ is determined empirically and is given in the following table.

| $\alpha(i)$ | $F_1[\alpha(i)]$ |
|---|---|
| 1 | 0.750 |
| 2 | 0.625 |
| 4 | 0.500 |
| 8 | 0.375 |
| 16 | 0.250 |
| 32 | 0.125 |

As seen from the table, comfort noise gain, $G_{cng}$(i,k), is inversely proportional to the noise suppression parameter.

104—Comfort Noise Frequency Spectrum Generation

The spectrally matched, high resolution, frequency spectrum of the comfort noise is generated by multiplying the unity magnitude frequency spectrum from generator 101 by the comfort noise gain from calculation 102. Specifically, the spectrum CN(m,k) at frame m is obtained as follows.

$$CN(m,k)=G_{cng}(i,k)C(m,k)$$

106—Time Domain Comfort Noise Generation

Finally, the spectrally matched frequency spectrum is transformed to time domain using the inverse DFT. Specifically, $$c(m,n)=\sum_{k=0}^{N-1} CN(m,k)\exp\left(\frac{j2\pi nk}{N}\right),\quad n=0,1,2,\ldots,(N-1)$$

where c(m,n) is the time domain comfort noise at frame m.

107—Windowing

Because the generated comfort noise is random, audible artifacts will be introduced at frame boundaries. In order to reduce the boundary artifacts, the comfort noise c(m,n) must be windowed using any arbitrary window; see above description of "Synthesis Window." The windowed comfort noise is buffered and the output rate is synchronized with the output rate of the noise reduction algorithm.

The invention thus provides improved comfort noise using a modified Doblinger noise estimate for a more efficient system for generating high resolution comfort noise that is spectrally matched to background noise. The comfort noise generator that substantially eliminates noise pumping by windowing the output.

Having thus described the invention, it will be apparent to those of skill in the art that various modifications can be made within the scope of the invention. For example, the use of the Bark band model is desirable but not necessary. The band pass filters can follow other patterns of progression. Noise suppression can be based on amplitude rather than power spectrum. The comfort noise can be added at several points in the circuit. As illustrated in FIG. 7, comfort noise is combined with frequency domain data in summation circuit 105, and then converted to time domain. As illustrated in FIG. 12, the comfort noise is separately converted to time domain and then combined with the noise suppressed signal.

What is claimed as the invention is:

1. In a telephone having an audio processing circuit including an analysis circuit for dividing a audio signal into a plurality of frames, each frame containing a plurality of samples, a circuit for calculating an estimate of background noise, a circuit for generating comfort noise, and means for combining the comfort noise with a processed audio signal, the improvement comprising:

said circuit for calculating an estimate includes a smoothing filter having a long time constant when the estimate increases from frame to frame; and said circuit for generating comfort noise includes a circuit for calculating the gain of the comfort noise in accordance with said estimate;

a generator producing a pseudo-random phase spectrum; and a multiplier for adjusting the gain of said spectrum to produce comfort noise that is spectrally matched to said background noise.

2. The telephone as set forth in claim 1 wherein said smoothing filter includes a first-order exponential averaging smoothing filter.

3. The telephone as set forth in claim 1 and further including a circuit for limiting spectral gain in said circuit for calculating a noise estimate.

4. The telephone as set forth in claim 3 and further including a speech detector, wherein the spectral gain limit is higher when speech is detected than when speech is not detected.

5. The telephone as set forth in claim 1 wherein said generator calculates transcendental functions.

6. The telephone as set forth in claim 1 wherein said generator calculates arithmetically.

7. The telephone as set forth in claim 1 wherein said circuit for calculating the gain of the comfort noise adjusts gain inversely proportional to a noise suppression factor.

8. The telephone as set forth in claim 1 wherein said comfort noise is generated in frequency domain and further including an inverse discrete Fourier transform for converting the comfort noise to time domain.

9. The telephone as set forth in claim 1 wherein said circuit for calculating an estimate includes a comparator for comparing the noise power estimate from one frame with the noise power estimate from another frame.

10. The telephone as set forth in claim 1 wherein said circuit for calculating an estimate includes a comparator for comparing the ratio of the noise power estimate from the current frame to the noise power estimate from the previous frame with a threshold.

* * * * *